(12) United States Patent
Ogasawara

(10) Patent No.: US 6,577,861 B2
(45) Date of Patent: Jun. 10, 2003

(54) ELECTRONIC SHOPPING SYSTEM UTILIZING A PROGRAM DOWNLOADABLE WIRELESS TELEPHONE

(75) Inventor: Nobuo Ogasawara, San Diego, CA (US)

(73) Assignee: Fujitsu Limited (JP)

( * ) Notice: Subject to any disclaimer, the term of this patent is extended or adjusted under 35 U.S.C. 154(b) by 0 days.

(21) Appl. No.: 09/211,308

(22) Filed: Dec. 14, 1998

(65) Prior Publication Data

US 2002/0059147 A1 May 16, 2002

(51) Int. Cl.⁷ ............................................. G06F 17/60
(52) U.S. Cl. ........................ 455/419; 235/462; 370/352; 705/26
(58) Field of Search ................................ 705/5, 16–26, 705/50, 64, 73; 455/403, 410, 411, 414, 418, 419, 420, 422, 4.1, 4.5; 370/352–358; 235/462, 472; 701/1

(56) References Cited

U.S. PATENT DOCUMENTS

| | | | |
|---|---|---|---|
| 5,334,824 A | 8/1994 | Martinez | |
| 5,410,326 A | * 4/1995 | Goldstein | 455/4.1 |
| 5,424,524 A | 6/1995 | Ruppert et al. | |
| 5,465,288 A | 11/1995 | Falvey et al. | |
| 5,500,517 A | 3/1996 | Cagliostro | |

(List continued on next page.)

FOREIGN PATENT DOCUMENTS

| | | |
|---|---|---|
| EP | 0843290 A2 | 5/1998 |
| EP | 0865219 A2 | 9/1998 |
| NL | 9002296 | 10/1990 |
| WO | WO 97/50222 | 12/1997 |
| WO | 99/46706 | 9/1999 |

OTHER PUBLICATIONS

Radio Communications Report, v 18, n 48, p.24 "Millicom releases GSM online payment system." Nov. 29, 1999.*

Business Wire, "Lava2140 Introduces Wireless E–commerce Application at PCS '99; E–Shop Mobile Delivers Unified Internet and Wireless Shopping Solution" Sep. 23, 1999.*

Newsbytes News Network, "France Telecom Readies E–Commerce By Phone Service", Feb. 24, 1999.*

Blankenhorn, D., 'Phones win Headlines during CES Week', Newsbytes, May 28, 1992.: Dialog Information Services, file 275: Gale Group Computer DB (TM), Dialog Accession # 10516628.

Nuttall, N. 'First the PC, now the Videophone', Times of London (TL), Apr. 24, 1992. Retrieved from: Dialog Information Services, file 710: Times/Sun. Times (London), Dialog Accession # 06875280.

Fenner, E., 'AT&T: The Store without Walls', Money, v22, n12, pp. 88–96, Dec. 1993. Retrieved from: Dialog Information Services, file 15: ABI/Inform ®, Dialog Accession # 00788284.

*Primary Examiner*—Richard Chilcot
(74) *Attorney, Agent, or Firm*—Christie, Parker & Hale, LLP

(57) ABSTRACT

An electronic shopping system facilitates purchase transactions via a wireless telephone. A purchase transaction program is downloaded from the seller's server to a purchaser's wireless telephone via a program loader contained within the purchaser's wireless telephone. The purchase transaction program is stored in a program memory of the purchaser's wireless telephone. The purchase transaction program is used by the purchaser to facilitate the selection of items to be purchased, as well as payment therefor. An external bar code reader is attached to the wireless telephone to facilitate the selection of items to be purchased and is controlled via the downloaded purchase transaction program.

36 Claims, 8 Drawing Sheets

U.S. PATENT DOCUMENTS

| | | | |
|---|---|---|---|
| 5,594,779 A | * | 1/1997 | Goodman ................. 455/54.2 |
| 5,606,361 A | | 2/1997 | Davidsohn et al. |
| 5,608,778 A | | 3/1997 | Partridge |
| 5,625,673 A | | 4/1997 | Grewe et al. |
| 5,675,524 A | | 10/1997 | Bernard |
| 5,722,069 A | * | 2/1998 | Donner ....................... 455/418 |
| 5,724,092 A | | 3/1998 | Davidsohn et al. |
| 5,825,002 A | | 10/1998 | Roslak |
| 5,832,115 A | | 11/1998 | Rosenberg |
| 5,867,712 A | | 2/1999 | Shaw et al. |
| 5,918,211 A | * | 6/1999 | Sloane ........................ 705/16 |
| 5,970,473 A | | 10/1999 | Gerszberg et al. |
| 6,055,513 A | | 4/2000 | Katz et al. |
| 6,085,176 A | | 7/2000 | Woolston |
| 6,124,882 A | | 9/2000 | Voois et al. |
| 6,134,548 A | * | 10/2000 | Gottsman et al. ............. 705/26 |
| 6,144,848 A | * | 11/2000 | Walsh et al. ................ 455/419 |
| 6,199,753 B1 | | 3/2001 | Tracy et al. |
| 6,202,051 B1 | | 3/2001 | Woolston |
| 6,226,031 B1 | | 5/2001 | Barraclough et al. |
| 6,313,864 B1 | | 11/2001 | Tabata et al. |
| 6,314,406 B1 | | 11/2001 | O'Hagan et al. |
| 6,317,718 B1 | * | 11/2001 | Fano ............................ 705/1 |
| 6,377,570 B1 | | 4/2002 | Vaziri et al. |

* cited by examiner

FIG. 9

| Phone number | Telephone type | Download Program ID | Password | Customer ID | Customer name | Other customer profile information |
|---|---|---|---|---|---|---|
| | | | | | | |
| | | | | | | |
| | | | | | | |
| | | | | | | |
| | | | | | | |
| | | | | | | |

US 6,577,861 B2

ELECTRONIC SHOPPING SYSTEM UTILIZING A PROGRAM DOWNLOADABLE WIRELESS TELEPHONE

FIELD OF THE INVENTION

The present invention relates generally to electronic shopping systems and more particularly to an electronic shopping system which utilizes a program downloadable wireless telephone into which a purchase transaction program is downloaded from a vendor's server to enable a shopper to perform purchase transactions with the wireless telephone.

BACKGROUND OF THE INVENTION

Electronic shopping systems for allowing a shopper to purchase products without necessarily having to travel to a store are well known. One example of a contemporary electronic shopping system is a cable television shopping channel, wherein products are advertised on television. A shopper merely watches the television and when an item is shown for which a purchase is desired, the shopper uses a telephone to call an agent of the seller to place an order for the desired product. Usually, a credit card number is given over the telephone to facilitate payment for the purchased item. The purchased product is then shipped directly to the buyer.

In an improved version of cable television shopping, an interactive or bidirectional cable system allows the purchaser to make selections directly from the television screen. This may be accomplished by using a menu driven system controlled by the television remote control. In this manner, the need to make a telephone call is avoided. The added convenience of shopping directly from the television is expected to enhance consumer response to such advertisements.

Similar to cable television shopping is the use of the Internet to make desired purchases from the home. Many companies presently offer their products for sale on the Internet, and the number doing so is increasing rapidly. Products as diverse as pizzas, books and automobiles can readily be purchased from the comfort of a person's home, simply by locating the web page of a company selling the desired item, selecting the item to be purchased, providing an address to which the item is to be delivered, and providing a credit card number to pay for the purchased item.

However, one disadvantage of such contemporary electronic shopping systems is that they require that the prospective purchaser subscribe to either cable television or to an Internet service, for which a subscription fee is charged. Further, such contemporary electronic shopping systems require that purchases be made from either the purchaser's television or computer, both of which are typically located in the purchaser's home and cannot usually be easily transported. Thus, the purchaser is undesirably constrained to shopping from the home.

Because of the highly mobile nature of modern society, it is desirable to provide the ability to conduct electronic shopping from locations away from the home. For example, a purchaser may wish to order items from the workplace, over lunch in a restaurant, while traveling, and in a variety of other, different circumstances wherein the purchaser does not have access to his or her home television or computer.

It is also known to use a personal shopping system (PSS) wherein the purchaser carries a scanner embedded hand-held terminal within a store. Bar codes of products to be purchased are scanned with the hand-held scanner. A display on the scanner embedded hand-held terminal displays an item price and a running total of the purchase prices of the products which have been scanned. Payment for the scanned products is accomplished at a checkout counter in a conventional manner.

However, contemporary personal shopping systems require the use of a dedicated personal shopping system terminal, which has a small display, a number keypad, and a built-in bar code scanner. Of course, the use of such a contemporary dedicated portable personal shopping system requires a substantial financial investment by the retailer in the portable personal shopping system terminals.

Wireless telephones, such as cellular telephones, are very popular. As the price of wireless telephones and the cost of making calls therewith continue to decrease, more people are purchasing and using wireless telephones.

As used herein, the term wireless telephone is defined to include mobile telephones, cellular telephones, satellite telephones and any other telephones not requiring a wired connection, such as cordless home telephones which have a limited range and must generally therefore be used close to the house.

In view of the low cost and ubiquitous nature of wireless telephones, it is desirable to provide a system for performing electronic shopping which utilizes a customer's own wireless telephone for the selection of items to be purchased, as well as for providing payment for such purchased items. By utilizing the customer's own wireless telephone for electronic shopping, rather than using a dedicated personal shopping system terminal, the substantial investment associated with the use of such dedicated personal shopping system terminals is eliminated.

SUMMARY OF THE INVENTION

The present invention specifically addresses and alleviates the above-mentioned deficiencies associated with the prior art. More particularly, the present invention comprises an electronic shopping system for facilitating purchase transactions via a wireless telephone to which a program download function, a downloaded program execution function and an input/output port for external scanner connection have been added. However, since the functionality added to the wireless telephone is small, the wireless telephone is still capable of being produced as an inexpensive commodity product. The electronic shopping system comprises a server and at least one wireless telephone for communicating with the server. Thus, according to one preferred embodiment of the present invention, once a customer visits a store, the customer simply dials the number of the store's personal shopping system service. The personal shopping system application is then automatically downloaded into the customer's telephone. The downloaded program automatically begins execution and provides the desired functionality of a personal shopping system. A bar code scanner in communication with the telephone is used to scan the bar codes of purchased items. Thus, the present invention allows retailers to implement a personal shopping system while minimizing the cost investment necessary to do so.

More particularly, according to the present invention a store maintains a server which provides a downloadable purchase transaction program to a purchaser's wireless telephone when the purchaser calls the store's server via the purchaser's wireless telephone. After downloading the purchase transaction program from the server to the wireless telephone, the server communicates with the wireless telephone so as to use the downloaded purchase transaction program to facilitate selection of the desired product(s) for purchase, as well as to facilitate payment therefore.

It is desirable to download the purchase transaction program into a wireless telephone as needed, rather than to permanently store the purchase transaction program in the wireless telephone, because downloading allows a plurality of different sellers to utilize their own programs, rather than requiring a single, universal program for all sellers. It should be appreciated that different sellers will desire to incorporate different messages, advertisements, menus, etc. into their own purchase transaction program and to further customize their own purchase transaction program so as to tailor it to the particular products being sold.

Further, since different types of wireless telephones tend to have different displays, keypads, input/output ports, etc., it is desirable to download a purchase transaction program which is specifically tailored to a particular type of wireless telephone, so as to make the best use of that particular wireless telephone's features.

The purchase transaction program transmitted from the server to the wireless telephone is loaded into a program memory of the wireless telephone via a program loader of the wireless telephone. The program loader effects loading of the purchase transaction program into the program memory as the purchase transaction program is being transmitted from the server to the wireless telephone. The downloaded purchase transaction program contains instructions for facilitating product selection and payment via the wireless telephone. Thus, the purchase transaction program converts the wireless telephone into a point of purchase electronic shopping terminal.

Although the electronic shopping system of the present invention is described herein as being used to purchase products, those skilled in the art will appreciate that the electronic shopping system is likewise suitable for purchasing services, or anything else which is desired. Thus, use of the term "product" is by way of illustration only and not by way of limitation. Further, as used herein the term "store" is defined to include any seller of goods or services, including a retail store, a wholesale store, or any other vendor.

The server may either be disposed proximate (preferably within) a store with which purchase transactions are performed or at a location remote from the store with which purchase transactions are performed. The remote server may be located at any convenient location, since communication between the remote server and a purchaser's wireless telephone can be provided via a cellular telephone network. Typically, the remote server will be located in a manner which minimizes telephone costs.

The server, particularly a store server, may be either a dedicated server or may perform other functions, e.g., inventory control, accounting, word processing, and any other desired computer functions.

Optionally, a wireless extension PBX or the like may be utilized to facilitate wireless communication between the server and a purchaser's wireless telephone. The use of an extension PBX is particularly beneficial when a store server is provided and when electronic shopping within the store is desirable. Typically, the extension PBX is in wired communication with the store server. Use of such an extension PBX may eliminate or reduce the need for public cellular service provided by a common carrier, thus reducing costs substantially.

The program downloadable wireless telephone of the present invention further comprises a microprocessor which is in communication with the program loader such that the microprocessor facilitates execution of a download program stored by the program loader. Thus, by executing the download program, downloading of a purchase transaction program from the server to the wireless telephone is facilitated.

The microprocessor is also in communication with the program memory into which the purchase transaction program is downloaded, such that the microprocessor facilitates execution of the purchase transaction program.

The program loader preferably comprises a non-volatile firmware memory. Those skilled in the art will appreciate that various different types of memory are likewise suitable. For example, the program loader may comprise either read-only memory (ROM) or random access memory (RAM). The program loader may comprise either volatile or non-volatile memory. Various different memory devices may be utilized, including electrically programmable read-only memory (EPROM), erasable electronically programmable memory (EEPROM), flash memory, magnetic storage devices such as disc or tape drives, optical memory such as CD-ROM, or magneto-optical memory.

The firmware memory of the program loader contains instructions, i.e. the download program, which are executed to effect storage in the program memory of the purchase transaction program received by the wireless telephone from the server. That is, the firmware memory contains instructions for downloading the purchase transaction program from the server and for storing the purchase transaction program within the program memory of the wireless telephone.

The program memory preferably comprises a volatile random access memory (RAM) such as those commonly used in personal computers. However, various other types of read/write memory such as flash memory, magnetic storage devices, optical storage devices, and magneto-optical devices are likewise suitable. Typically, a new purchase transaction program is downloaded each time a telephone call is made to the server by the wireless telephone.

Preferably, the wireless telephone of the electronic shopping system of the present invention comprises an input/output port in communication with the microprocessor thereof. A bar code scanner attached to the input/output port of the wireless telephone facilitates scanning of bar codes which represent the items to be purchased.

Further, the wireless telephone of the present invention preferably comprises a built-in IC card reader/writer or the like in communication with the microprocessor thereof. The IC card reader/writer facilitates payment for purchased goods with an IC card or the like.

The bar code scanner may alternatively be built into the wireless telephone rather than be connectable thereto. That is, the bar code scanner may be disposed at least partially within the housing of the wireless telephone, so as to define an integral unit therewith.

Thus, according to the present invention, a customer uses his own wireless digital telephone at a retail store as a personal shopping terminal. When the customer visits the store, a bar code scanner is attached to the customer's wireless telephone if the customer's wireless telephone does not have a scanner built therein to. The scanner may be provided by the retail store, or alternatively may be the customer's own scanner. If a scanner must be added to the wireless telephone, then either a cable or a cordless connection, such as an irDA connection is used.

The customer calls a predefined telephone number for the store's personal shopping service. Either a commercial telephone network or an in-store extension network may be utilized to make the telephone call. After calling the predefined telephone number, the customer's telephone is connected to the store server (or a remotely located, out of store server). In either instance, the server obtains the caller's telephone number, then searches a customer information database. If the caller's telephone number is in the customer information database, the server assumes (at least temporarily) that an authorized customer is making the telephone call and next obtains the telephone type from the customer information database. Then the server downloads a purchase transaction program to the customer's wireless telephone. Next, the server optionally requests for the customer to input a password, so as to further verify the customer's authority to make purchase transactions.

The downloaded purchase transaction program is a personal shopping application program suitable for use with the customer's wireless telephone, based upon the type of telephone that the customer is using.

Alternatively, password authentication may be performed prior to purchase transaction program download. However, performing password authentication purchase transaction after program download allows the downloaded purchase transaction program to control the password entry process, thus allowing more flexibility in the password entry process. In this manner, the downloaded purchase transaction program may, for example, provide guidance to aid in the password entry process.

According to the preferred embodiment of the present invention, the telephone number, telephone type, and password are pre-registered, along with a customer ID, customer name, and any other desired customer profile information, when the customer enrolls in the personal shopping system. In this manner, the customer is identified by a telephone number rather than a customer ID card. Once an appropriate purchase transaction program has been downloaded to the customer's wireless telephone, then the wireless telephone functions as a personal shopping terminal. When a customer scans an item, the telephone sends the scanned bar code information to the server. The server then preferably returns a description of the item and price information. This item description and price information is displayed on the telephone's display. When the customer finishes shopping, then self payment is performed, preferably utilizing the customer's wireless telephone. This may optionally be performed at a checkout terminal of the store. When checkout is performed at a store check-out terminal, the telephone may be used to scan a bar code of the checkout terminal or, alternatively the checkout terminal is provided with the telephone number or customer ID so as to link the telephone transaction and the checkout terminal to one another to effect payment.

Thus, according to the preferred embodiment of the present invention, both the customer and the telephone type are identified by the customer's telephone number. Preferably, different programs are utilized for each different telephone type, due to differences in the microprocessor, display, keypads, input/output ports, and other interfaces of each different type of wireless telephone.

Thus, according to the preferred embodiment of the present invention, the downloaded purchase transaction program requests a password input from the user, displays password input guidance, and reads keypad input of the password. The password is sent to the server for customer verification. The downloaded purchase transaction program receives password authentication verification from the server. If password authentication verification is okay, then the downloaded purchase transaction program proceeds. If password authentication is not okay, then the downloaded purchase transaction program repeats its request for a valid password for a predetermined number of times. After the predetermined limit has been exceeded, then the downloaded purchase transaction program ceases. The downloaded purchase transaction program facilitates the scanning of desired bar codes and sends the scanned bar codes to the server. The downloaded purchase transaction program receives a response from the server, then displays the response, if appropriate. A displayed message provides a description and price for the scanned item. Also, total calculated price is provided as purchases are accumulated.

Preferably, the downloaded purchase transaction program facilitates return of previously scanned items, by utilizing the keypad to identify the item to be returned, or by scanning the returned item again and depressing a predefined key in the keypad to indicate return item. The returned item's price is removed from the accumulated total.

The downloaded purchase transaction program also facilitates payment for the purchases. When self payment is made, the customer depresses a predefined key sequence on the keypad of the wireless telephone to inform the downloaded purchase transaction program that shopping is finished. The total price is displayed and the customer acknowledges the total via the keypad. After verifying the total price, then the downloaded purchase transaction program optionally asks the customer which payment method is to be utilized, preferably via a menu. The customer then selects the desired method of payment via the keypad. Optionally, the customer may use a pre-registered credit card account to effect such payment. If a receipt is requested by the customer, then a receipt printer server at a in-store location provides the customer with a receipt.

Alternatively, payment may be effected at a checkout counter, wherein the customer goes to the checkout terminal, e.g., a point-of-sale terminal, and scans the checkout terminal's bar code, or input checkout terminal ID from the keypad, or input the telephone number or customer ID at the checkout terminal in order to link the wireless telephone and the checkout terminal to one another. The checkout terminal receives shopping information from the server (which was previously communicated from the wireless telephone to the server) and payment may be effected in a contemporary manner, e.g., via cash, credit card, debit card, check, etc.

If a remote server is utilized, and the remote server services a plurality of different retail stores using the same telephone number, then the customer's telephone may send store location information, which may be effected via scanning of a store bar code located on a shopping cart, for example. This store location information is used for inventory management such that items purchased from a given store are identified as having been purchased from that particular store.

According to the preferred embodiment of the present invention the server receives the incoming telephone call from the customer's wireless telephone and downloads the appropriate purchase transaction program to the customer's wireless telephone. The server also sends and receives information to and from the customer's telephone, via a server personal shopping application. When the server is called by the customer's telephone, the telephone interface obtains the caller's telephone number, then searches the customer information database within the server so as to obtain the customer's telephone type, the customer's identification number, and the customer's name. This information is preferably stored in the server's customer information database when the customer enrolls in the personal shopping program. The appropriate download program is then selected based upon the customer's telephone type information and is downloaded to the customer's wireless telephone. The customer's identification number and name are passed to the server personal shopping application, from the customer information database.

During shopping, each message which comes from a customer's wireless telephone is associated with the customer's wireless telephone number, customer identification, and/or some other desired customer identification. When the server receives bar coded data from the customer's wireless telephone, the server searches a database to obtain the item description and price. Item description and price information is then transmitted to the customer's wireless telephone. A list of the items being purchased is maintained by the server, so as to facilitate later payment therefore.

Optionally, the server may additionally transmit other information, such as promotional information, discount information, a personal greeting, etc. to the customer' wireless telephone, if desired.

The optional built-in IC Card reader/writer facilitates interface to an IC or Smart Card. The use of such an IC Card will extend the security features and services of the wireless telephone. Password authentication is optionally replaced by automatic authentication via the IC Card. An IC Card provides dual direction authentication, wherein both the customer and the server are validated. Further, the IC Card may be used for payment, either via electronic cash or secured credit card. An electronic receipt may be stored within the IC Card. The electronic receipt is originated at the server and sent to the wireless telephone and then stored in the IC Card. Stored electronic receipts may later be input to a personal financial application, such as in a personal computer at the home of the customer. The electronic receipt may also simply be displayed by a home personal computer. A plurality of such electronic receipts may be stored in the IC Card, so as to define a shopping history of the customer.

Modified wireless telephones according to the present invention may also be used in a variety of other, different applications. Since many different application programs may be downloaded from various different servers, and since the wireless telephone is carried by its owner (rather than remaining at a retail location, such as in contemporary personal shopping systems) implementation in a variety of different applications is possible. Thus, a user may interact with the display and keypad of the wireless telephone to perform a variety of different desired transactions.

Voice/sound guidance and voice command/inquiry may be utilized to simplify the process. Voice/sound guidance and voice command/inquiry are preferably performed by the downloaded purchase transaction program and/or server in parallel with non-voice processing. A downloaded purchase transaction program may provide voice guidance and/or error messages by voice through speaker of wireless phone in parallel with displaying of message guidance via a display of the phone. Also, the downloaded purchase transaction program may optionally have voice recognition capability. Thus, voice command, menu selection by voice and/or purchased item selection by voice may be performed in addition to using keys of the keypad of the phone and scanning bar codes with an external scanner.

The server application program and/or store personnel at the server site may also provide voice/sound guidance and voice command/inquiry capability in parallel with non-voice processing. A server application may send voice guidance to the wireless telephone, and also may accept voice command and/or purchase item selection by voice if the server application program has voice recognition capability. Further, store personnel at the server site may accept voice inquiry from the wireless telephone and may provide answers to the wireless telephone by voice.

Thus, the present invention provides a convenient means for shopping, either while at a store where goods are to be purchased or while away from the store. The selection of desired items is easily and conveniently performed by simply scanning bar codes representative of the desired items. Payment for the purchased items is easily accomplished with an IC card or the like. The personal shopping system of the present invention can be implemented with minimal investment since it involves the modification of an existing product, i.e., a wireless telephone.

BRIEF DESCRIPTION OF THE DRAWINGS

These and other features, aspects and advantages of the present invention will be more fully understood when considered with respect to the following detailed description, appended claims and accompanying drawings, wherein:

FIG. 9 is a customer information table.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The detailed description sets forth the construction and functions of the invention, as well as the sequence of steps for operating the invention in connection with the illustrated embodiment. It is to be understood, however, that the same or equivalent functions may be accomplished by different embodiments that are also intended to be encompassed within the spirit and scope of the invention.

Figure 1:
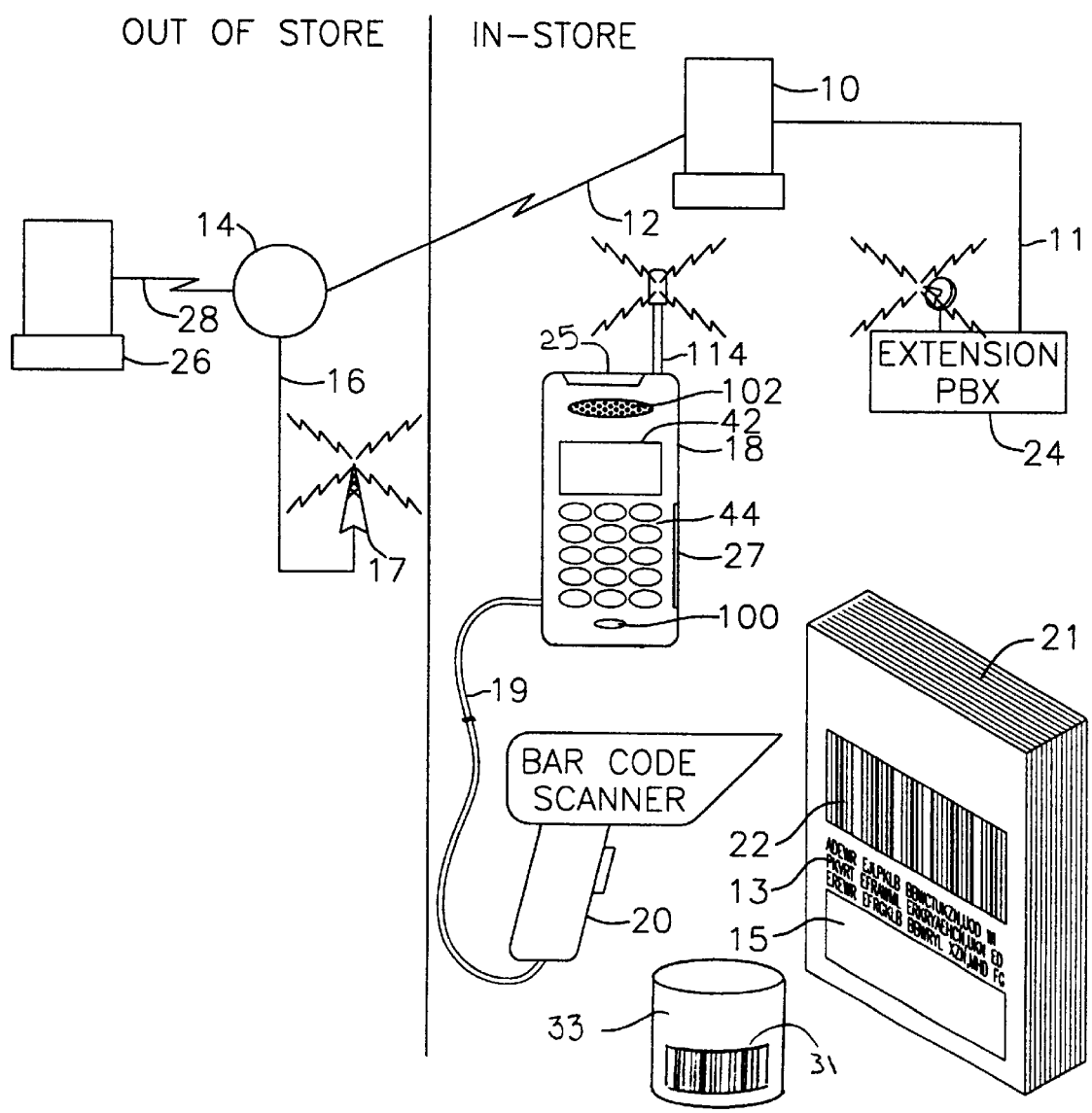
FIG. 1 is a schematic overview of the electronic shopping system of the present invention.

Referring now to FIG. 1, the present invention generally comprises a store server 10 in communication with a commercial telephone network 14, typically via a wire connection 12. Alternatively, the store server 10 may communicate with the commercial telephone network 14 via any other desired means, such as via fiber optics, radio signals, etc. Such commercial telephone networks are those commonly used to communicate voice and data both locally and over long distances. Example of such commercial telephone networks include Pacific Bell, General Telephone, AT&T, MCI and Sprint.

The commercial telephone network 14 facilitates connection of the store server 10 to a wireless telephone 18 via a cellular telephone network 17, to which the conventional telephone network 14 is in communication, typically via a wire connection 16. Examples of such cellular telephone networks include L.A. Cellular and Pacific Bell. Again, the wired connection 16 may alternatively comprise a fiber optic, radio or other means of communication.

The cellular telephone network 17 communicates with the wireless telephone 18 via radio transmission according to well known principles.

Alternatively, a remote server 26, rather than the store server 10, communicates with the wired telephone network 14, again preferably via a wire connection 28. The wire connection 28 may alternatively comprise fiber optic, radio, or other communication means.

Optionally, the store server 10 is in communication with an extension PBX 24 or the like, preferably via a wired connection 11. The extension PBX 24 communicates with the wireless telephone 18 via a radio connection.

Optionally, an external bar code scanner 20 communicates with the wireless telephone 18 via wire connection 19. Alternatively, the bar code scanner 20 communicates with the wireless telephone 18 via infrared, laser, radio, or any other desired means.

Alternatively, a built-in bar code scanner 25 and/or a built-in IC card reader/writer 27 are formed integrally with the wireless telephone 18. In a store, a bar code on a purchased item 33 is scanned by bar code scanner 20 attached to a wireless telephone 18.

A catalog 21 of the items which can be purchased contains a bar code 22 for each such item, and preferably also contains descriptive text 13 and a picture 15 of each item. The use of such a catalog 21 or the like facilitates the purchasing of products via the electronic shopping system of the present invention when the purchaser is not in the store where the items are sold. Typically, each item 33 also has a bar code 31 applied thereto.

The store server 10, as well as any remote server 26, if used, stores the purchase transaction program which is to be downloaded into the wireless telephone 18 when a call is made from the wireless telephone 18 to the store server 10 or the remote server 26. The store server 10 and the remote server 26 also contain a program, i.e., the server personal shopping application (FIG. 2), which cooperates with the purchase transaction program downloaded to the wireless telephone 18 to effect purchase transactions, including the selection of items to be purchased and payment therefore, as discussed in detail below.

When the wireless telephone 18 is used within or close to the store where the store server is located, then the optional extension PBX 24 may be utilized to facilitate radio communication between the store server 10 and the wireless telephone 18, thereby eliminating the need for the cellular telephone network 17. By using an extension PBX 24, reliable communication between the store server 10 and the wireless telephone 18 is assured and costs associated with use of the cellular network 17 are avoided. Those skilled in the art will appreciate various other means of providing in-house radio communication between the wireless telephone 18 and the store server 10 are likewise suitable.

Figure 2:
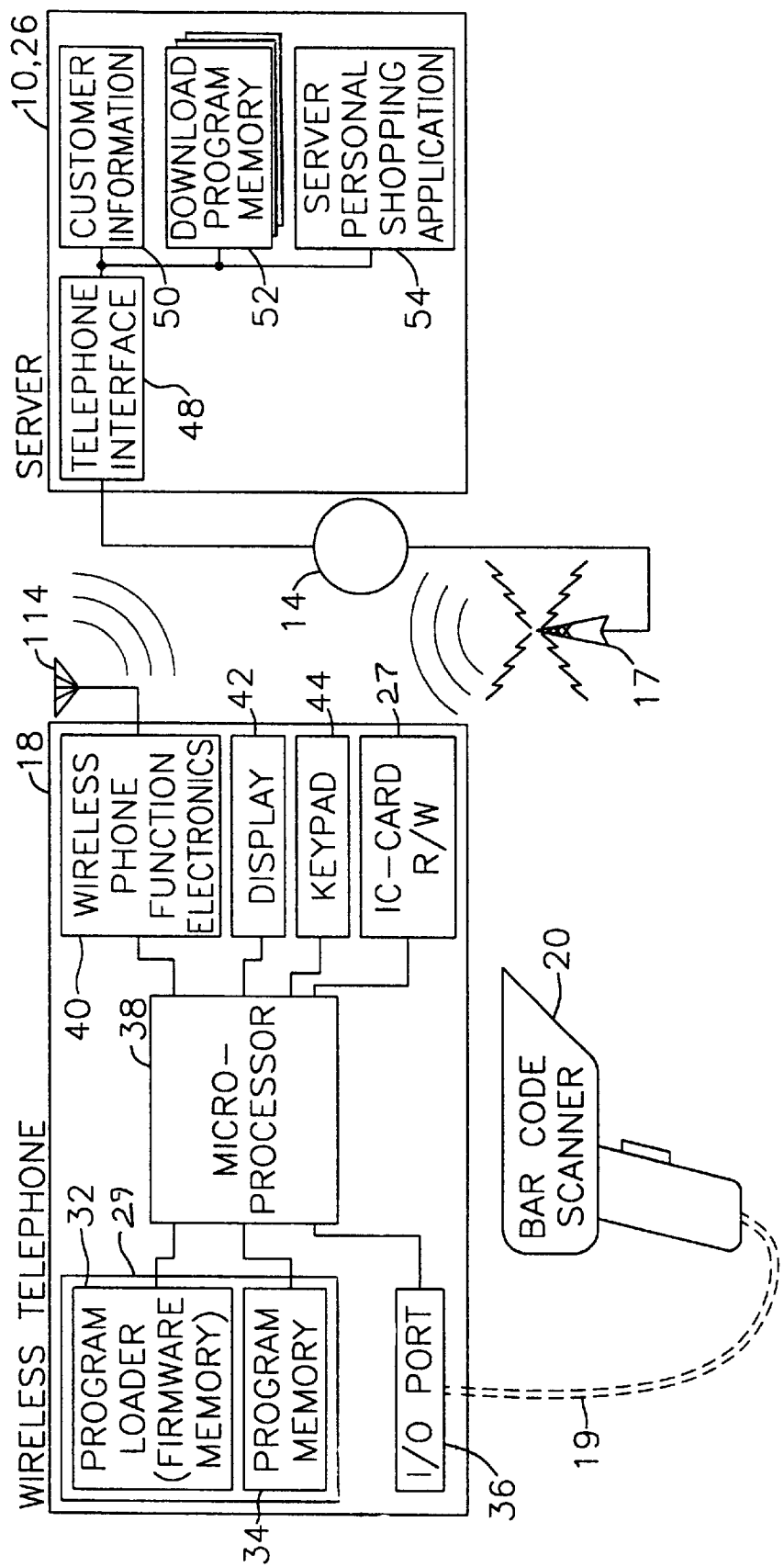
FIG. 2 is a block diagram showing the wireless telephone and a server in further detail.

In use, a purchaser merely dials the telephone number of the store server 10 or remote server 26 with the wireless telephone 18. Upon connection of the wireless telephone 18 to the store server 10 or the remote server 26, the purchase transaction program is downloaded from the store server 10 or the remote server 26 into the wireless telephone 18 under the direction of a program loader 32 (FIG. 2).

More particularly, the telephone interface of the store server 10 or remote server 26 facilitates receipt of the telephone call from the customer and downloading of the appropriate purchase transaction program to the wireless telephone 18. The server personal shopping application facilitates sending and receiving of information between the customer's wireless telephone 18 and the store server 10 or remote server 26. When the store server 10 or remote server 26 is called by the customer's wireless telephone 18, then the telephone interface obtains the customer's phone number and then searches the customer information database in the store server 10 or remote server 26 in order to obtain the following information: customer's telephone number, download program ID, customer ID, and customer name. This information is preferably stored in the store server 10 or remote server 26 when the customer enrolls in the personal shopping application. In this manner, the customer's telephone number provides a degree of validation, and thus serves to indicate that the customer is authorized to make purchases.

Based upon the download program ID, the appropriate download program is downloaded from the store server 10 or remote server 26 to the wireless telephone 18. The particular purchase transaction program (which has a unique ID) which is transmitted from the store server 10 or remote server 26 to the wireless telephone 18 is selected so as to be consistent with the purchaser's profile, e.g., telephone type, as well as the purchaser's personal preferences, such as language and particular interests.

The store server 10 or remote server 26 personal shopping application facilitates purchase transactions. Each message coming from a wireless telephone 18 is associated with the customer's telephone number, the customer ID, or some other unique identification. When the store server 10 or remote server 26 receives bar code data from the customer's wireless telephone 18, then the store server 10 or remote server 26 searches a database and obtains a description and price for the item scanned. The item description and price is then transmitted to the customer's wireless telephone 18 and is preferably displayed upon the display 42 thereof. All of the data received from the customer's wireless telephone 18, including data regarding returned items (those which the customer has decided not to purchase) are kept by the store server 10 or remote server 26 so as to facilitate a subsequent payment procedure.

Optionally, the store server 10 or remote server 26 also sends other information to the customer's wireless telephone 18. Such other information may comprise promotional information, discount information, a personal, etc.

After being downloaded, the purchase transaction program optionally requests that the purchaser enter a password. The use of such a password provides further validation of the customer. The use of such a password is particularly useful in preventing the use of a stolen wireless telephone 18 in the performance of unauthorized purchase transactions. The purchase transaction program may display instructions and/or provide voice guidance to the user for using the keypad to input the password. Voice recognition may be used to enter the password. Preferably, the download program, the server, or store personnel provide guidance for entering the password, as described below. The purchase transaction program may either verify the password or communicate the password to the server for verification. If the password is determined to be valid, then the customer is prompted to scan bar codes of items which are to be purchased. If the password is determined to be invalid, then the user is prompted to re-enter the password.

After the password is verified, the purchase transaction program facilitates use of the wireless telephone 18 to both select items to be purchased and pay for those items. Items are preferably selected for purchase by scanning bar codes 31 or 22 indicative of the item to be purchased via bar code scanner 20 which is connected to the wireless telephone 18 or via built-in bar code scanner 25. Alternatively, items to be purchased may be selected by entering a stock number, such as a Universal Product Code (UPC) code, via the telephone keypad.

After the desired items have been selected, payment therefor is preferably effected via a built-in IC card reader/writer 27.

When the wireless telephone 18 is used to make purchases within a store, bar codes on merchandise or bar codes on the store shelf where the product is displayed, upon the product to be purchased or within a catalog, may be scanned to facilitate selection of desired items to be purchased. When the wireless telephone 18 is used to make purchases while away from the store, then a catalog 21 or any other source of bar codes may be utilized.

As each bar code is read, the purchase transaction program sends bar code data, such as SKU (Stock Keeping Unit) code or the Universal Product Code represented thereby, to the server and the server then preferably responds by sending a description and price for the product back to the wireless telephone 18, where the information is preferably shown upon the display 42 thereof. Also, the total price of items selected for purchase is preferably displayed.

Referring now to FIG. 2, the wireless telephone 18 and a store or remote server 10, 26 are shown in further detail. It should be appreciated that the store server 10 is generally identical to the remote server 26. However, the remote server 26 is located away from the store.

The wireless telephone 18 comprises a microprocessor 38 in communication with wireless telephone function electronics 40, display 42, keypad 44, input/output port 36, and IC card reader/writer 27. The microprocessor 38, wireless telephone function electronics 40, display 42, keypad 44, input/output port 36, and IC-card reader/writer 27 are all typical components of a contemporary wireless telephone.

To such a contemporary wireless telephone is added an electronic shopping section 29, so as to facilitate the practice of the present invention. The electronic shopping section 29 comprises program loader 32 and program memory 34, all of which are in communication with microprocessor 38.

The input/output port 36 facilitates electrical communication between the microprocessor 38 and bar code scanner 20 via RS232C, USB, IEEE1394, irDA or any other suitable interface 19.

The microprocessor 38 may be any conventional microprocessor or digital signal processor suitable for use in contemporary wireless telephone applications. The wireless telephone function electronics 40 comprise the electronics associated with the functions of a contemporary wireless telephone, such as telephone number memory, dialing, connect and disconnect circuitry, digital encoding (if used), radio frequency modulation and demodulation, and power amplification. The display 42 is typically an LCD display which displays the number being dialed, as well as various other optional information such as battery charge level, signal strength, individual call time and total call time. The keypad 44 is used to enter numeric, and optionally alpha, character information. The IC-card reader/writer 27 is used to read and write to an integrated circuit (IC) card which contains user account information and may be used with a plurality of different compatible wireless telephones, generally so as to facilitate billing to a desired customer. Thus, a first person may use his or her personal IC-card in a second person's cellular telephone to assure that a call is billed to the first program.

The electronic shopping section 29 comprises some of those components of the present invention which are added to a contemporary wireless telephone so as to facilitate electronic shopping according to the present invention. More particularly, the program loader 32 comprises a firmware memory which stores instructions for facilitating the download of the purchase transaction program from the server 10, 26. Instructions stored in the firmware memory of the program loader 32 are executed by microprocessor 38 after a call has been placed from the wireless telephone 18 to the server 10, 26 as discussed in detail below.

The program loader 32 optionally also comprises any desired circuitry which facilitates or enhances downloading of the purchase transaction program. Indeed, the program loader may optionally comprise only active circuitry rather than memory, if so desired. Such active circuitry is configured to respond to connection of the wireless telephone 18 to the server 10, 26 by effecting automatic download of the purchase transaction program without requiring that instructions be read from a memory.

Optionally, the program loader 32 comprises instructions, drivers, and/or circuitry which facilitates or enhances portions of the selection and/or payment processes. For example, the program loader 32 optionally contains drivers for the scanner 20 and/or IC card reader/writer 27.

Program memory 34 contains the purchase transaction program after it has been downloaded. This purchase transaction program is used by the purchaser to make product selections and to pay for purchased products.

The firmware memory of the program loader 32 comprises a non-volatile memory because the instructions stored therein do not change often. Conversely, the program memory 34 preferably comprises a volatile memory, since the purchase transaction program stored therein is downloaded for each use thereof.

Optional input/output port 36 facilitates communication with optional bar code scanner 20, so as to allow a purchaser to make product selections by scanning contemporary UPC bar codes 22, 31 (FIG. 1) or the like. The bar codes may be scanned from a catalog, a shelf within a store, the product itself, or any other desired location.

Optional IC card reader/writer 27 facilitates payment for purchased products via the use of an IC card or the like.

The server 10, 26 comprises a telephone interface 48 which is in communication with a customer information database 50, at least one download program memory 52 and a server personal shopping application 54.

The telephone interface 48 of server 10, 26 facilitates communication of the server 10, 26 with a telephone network and preferably comprises a conventional modem. Alternatively, the telephone interface 48 may comprise a cable modem, a network card, or any other device which facilitates communication with a commercial telephone system.

The customer information database 50 contains information regarding each customer's authorization to participate in electronic shopping.

The customer information database preferably comprises the phone number, telephone type, password, customer ID, customer name, and any other desired customer profile information, as shown in FIG. 9. The customer profile information may also contain credit information, shipping addresses, product interests, and/or prior shopping history.

The server 10, 26 retrieves caller's telephone number information from the customer information database 50 so as to determine download program ID from the download program memory 52 which is tailored specifically to the telephone of the purchaser.

The purchase transaction program which is downloaded from the download program memory 52 of server 10,26 to a purchaser's wireless telephone 18 comprises instructions which facilitate the selection of products to be purchased and payment therefor. The purchase transaction program may either be identical for all purchasers or alternatively may be different for different individual purchasers or classes of purchasers, as desired.

When different purchase transaction programs are used for different customers, a download program ID may be associated with each different customer, in the customer information database (FIG. 9), so as to properly associate the desired download program with each customer.

It may be beneficial to provide different purchase transaction programs for different purchasers. For example, different purchase transaction programs may contain different languages, menus, options, methods for making selections, and/or methods for making payment for purchases. Further, different purchase transaction programs may optionally contain messages or advertisements of interest to particular purchasers. Thus, those purchasers who are interested in sports, for example, would receive news and/or advertisements related to sports activities.

The purchase transaction program may be written in any suitable programming language, such as Java, HTML or C++.

Since not all purchasers will necessarily have either a bar code scanner 20 or an IC card reader/writer 27, tailored purchase transaction programs may be provided to individual purchasers, so as to accommodate each individual purchaser's particular wireless telephone 18 and/or other electronic shopping devices, e.g., bar code scanner 20, IC card reader/writer 27. That is, if a particular purchaser does not have an IC card reader/writer 27, for example, then that portion of the purchase transaction program which facilitates operation of such an IC card reader/writer 27 may be omitted. Further, if the purchaser does not have an IC card reader/writer 27, and must therefore enter credit card information, i.e. account number and expiration date, via the keypad 44, then the purchase transaction program contains instructions for facilitating use of the keypad 44 to pay for the purchase of products. In this manner, the purchase transaction program is tailored to particular purchasers and the size of the purchase transaction program tends to be minimized by eliminating those portions of the program which are not to be used by a particular purchaser.

Alternatively, the purchase transaction program comprises instructions which facilitate all modes of operation of the wireless telephone 18 and any associated devices, e.g., bar code scanner 20, IC card reader/writer 27, etc. In this manner, a single, identical purchase transaction program is always downloaded to every purchaser, thereby simplifying the operation of server 10, 26. Of course, the disadvantage of such operation is that a larger purchase transaction program must be downloaded to the wireless telephone 18, thereby requiring more memory in the wireless telephone 18. The download of such a comprehensive purchase transaction program will also take longer.

Server personal shopping application 54 is a program which is stored at server 10, 26 and which facilitates operation of the server 10, 26 to perform electronic shopping. The server personal shopping application 54 facilitates the downloading of purchase transaction program to a wireless telephone 18 after the wireless telephone 18 has dialed server 10, 26 and established a connection therewith as discussed above. Server personal shopping application 54 also facilitates the receiving and processing of product selections made by a purchaser utilizing the wireless telephone 18 as discussed above. The server personal shopping application 54 also receives and stores payment information, such as credit card account numbers, expiration dates, etc. The server personal shopping application 54 also facilitates the reading and updating of information on a purchaser's IC card via IC card reader/writer 27, if utilized.

Optionally, server personal shopping application 54 performs billing functions, such as performing the necessary communications and transactions with credit card companies in order to facilitate the billing of purchasers by the credit card companies.

Figure 3:
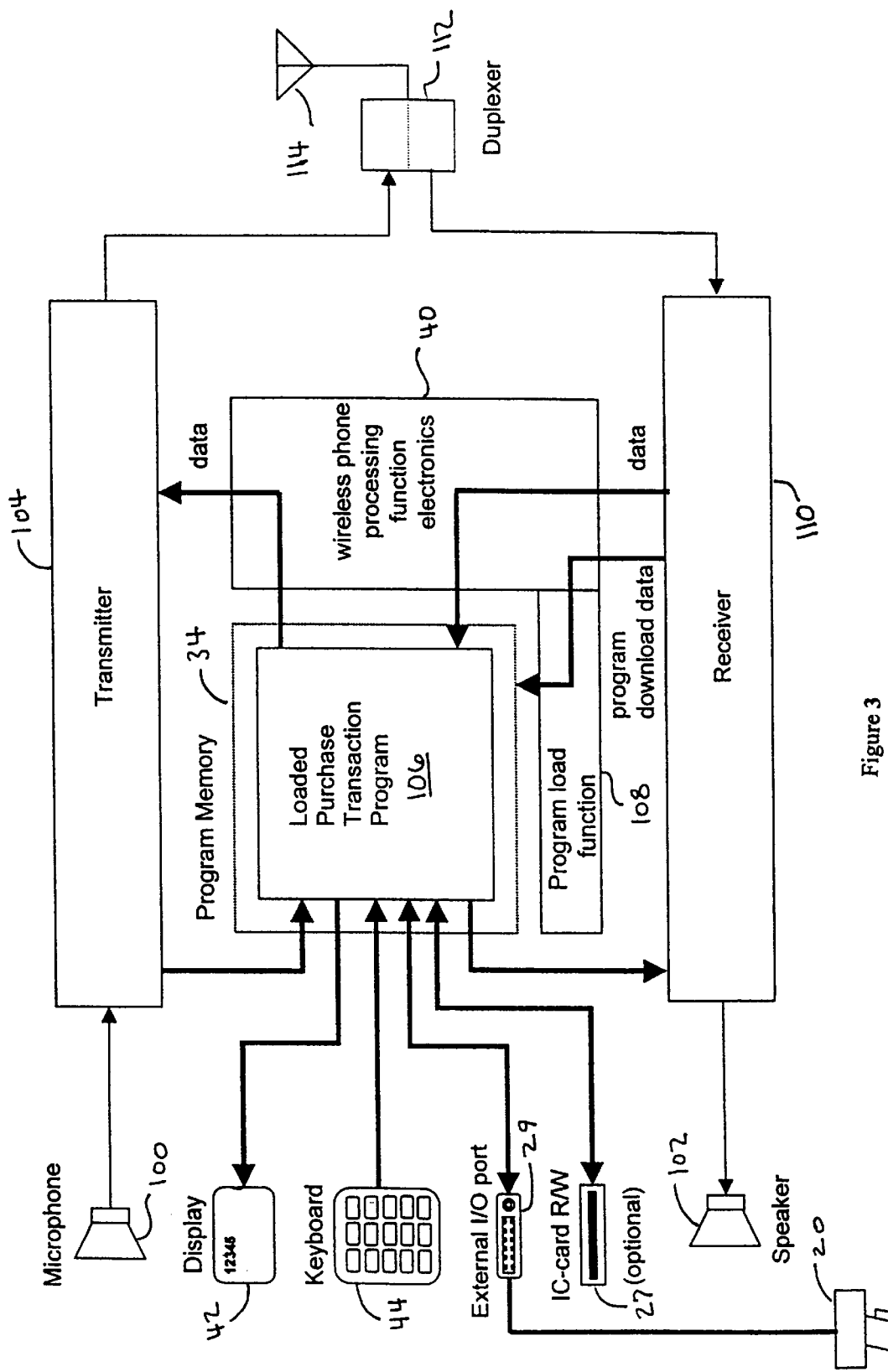
FIG. 3 is a functional block diagram of the wireless telephone of the present invention.
Figure 4:
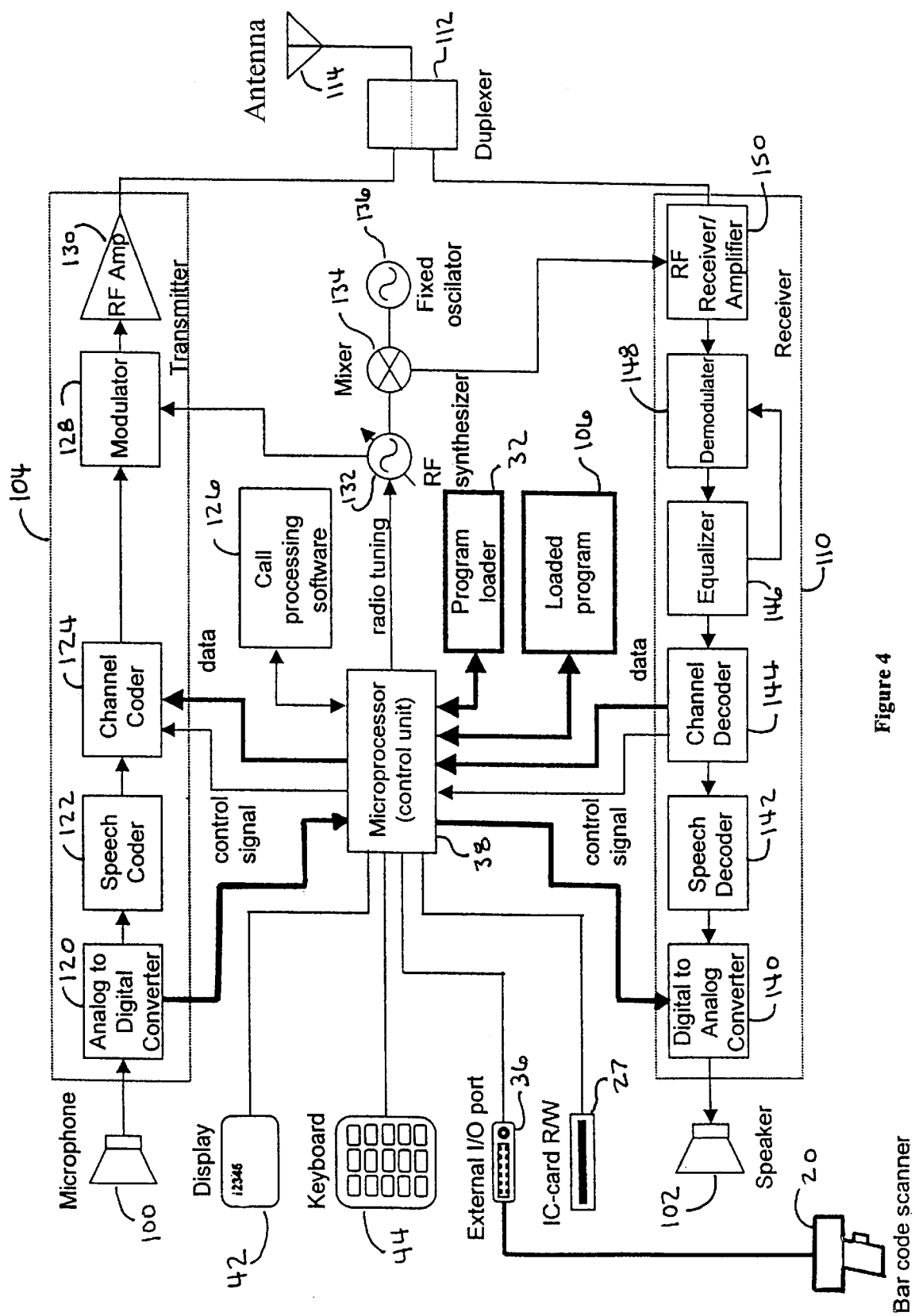
FIG. 4 is a block diagram of the wireless telephone of the present invention showing the interrelationship of the components of the present invention (shown with bold or heavy lines) with the components of a contemporary wireless telephone.

Referring now to FIG. 3, the receiver 110 of the wireless telephone 18 receives the purchase transaction program via the antenna 114 and the duplexer 112 and provides the purchase transaction program, according to the program load function 108 of the program loader 32 (FIG. 2) to program memory 34, where the loaded purchase transaction program 106 is stored so as to facilitate its execution via microprocessor 38 (FIGS. 2 and 4). Program load function 108 transfers control to the Loaded Purchase Transaction Program 106 upon completion of downloading. Then the Loaded Purchase Transaction Program 106 starts execution. During execution of the loaded purchase transaction program 106, the receiver 110 receives data from server 10, 26 (FIGS. 1 and 2) such as product descriptions and prices, and the transmitter 104 transmits information to the server 10, 26, such as Universal Product Codes and the quantity of each item ordered.

Optionally, the microphone 100 and the speaker 102 of the wireless telephone 18 may be utilized in a conventional manner to communicate with either a person or the server 10,26 (via voice recognition and synthesis), such that verbal inquiries of the purchaser may be addressed while simultaneously performing purchase transactions. Thus, the wireless telephone processing functional electronics 40 are preferably configured such that voice and data may be intermixed during the purchasing process, when the wireless telephone 18 is in communication with the server 10, 26. In this manner, store advertisements and announcements may also be transmitted as voice from the server 10, 26 to the wireless telephone 18.

Referring now to FIG. 4, the wireless telephone 18 comprises call processing software 126, RF synthesizer 132, mixer 134, fixed oscillator 136, duplexer 112 and antenna 114, which operate as in contemporary wireless telephones. A transmitter 104 comprises analog to digital converter 120, speech coder 122, channel coder 124, modulator 128, and radio frequency amplifier 130 which operate according to well known principles. Further, the receiver 110 comprises digital to analog converter 140, speech decoder 142, channel decoder 144, equalizer 146, demodulator 148, and radio frequency receiver/amplifier 150 which also operate according to well known principles.

The electronic shopping section (29 of FIG. 2) which is added to a contemporary wireless telephone comprises program loader 32, loaded program 106 (which is stored within the program memory 34 of FIG. 2), and bar code scanner 20 optimally connected to the wireless telephone 18 via external input/output port 36. The added components, along with the data paths therefor, are shown in bold in FIG. 4.

The data path from the channel decoder 144 to the microprocessor 38 accommodates the communication of data from the server 10, 26 to the microprocessor 38 of the wireless telephone 18, such as during purchase transaction program downloading and execution of the purchase transaction program. The data channel from the microprocessor 38 to the channel coder 124 facilitates the communication of data from the microprocessor 38 to the server 10, 26 during execution of the purchase transaction program 106.

The data path from the analog to digital converter 120 to the microprocessor 38 accommodates the communication of voice data from the microphone 100 to the loaded program 106, such as voice command, menu selection by voice and/or purchased item selection by voice. The downloaded purchase transaction program optionally has voice recognition capability and voice data is recognized properly by the purchase transaction program in parallel with input from keyboard 44 and external bar code scanner 20. The data channel from the microprocessor 38 to the digital analog converter 140 facilitates the communication of voice data from the loaded program 106 to the speaker 102, such as voice/sound guidance and error message by voice. The downloaded purchase transaction program provides voice message to purchaser through speaker of the wireless telephone in parallel with message displaying on the display of wireless telephone. Also, voice data between the wireless telephone and the server may be transferred by the microphone/transmitter and receiver/speaker in parallel with transfer of non voice data and processing of the downloaded purchase transaction program.

As in contemporary digital wireless telephone communications, each message slot consists of both control signals and data. Control signals are used for transmission/reception control. According to contemporary practice, data is the digitized voice message transmitted by a person speaking over the wireless telephone 18. However, according to the practice of the present invention, such data comprises digital information representative of purchase selections, prices, quantities selected, etc., as well as optional voice data.

Thus, according to the present invention, the antenna 114 receives a radio frequency signal which comprises the purchase transaction program. The radio frequency receiver/amplifier 150 is coupled to receive the radio frequency signal from the antenna 114 and amplifies the radio frequency signal. The demodulator 148 is coupled to receive the amplified radio frequency signal from the radio frequency receiver/amplifier 150 and demodulates the amplified radio frequency signal. The equalizer 146 is coupled to receive the demodulated signal from the demodulator 148 and equalizes the demodulated signal so as to mitigate distortion thereof according to well known principles. The channel decoder 144 is coupled to receive the equalized signal from the equalizer 146 and separates non-speech digital data from the equalized signal. Thus, the channel decoder 144 separates the purchase transaction program from the equalized signal and communicates the purchase transaction program to the program memory 34 under the direction of the program loader 32.

Referring now to FIGS. 5–8, operation of the electronic shopping system of the present invention is discussed in detail.

Figure 5:
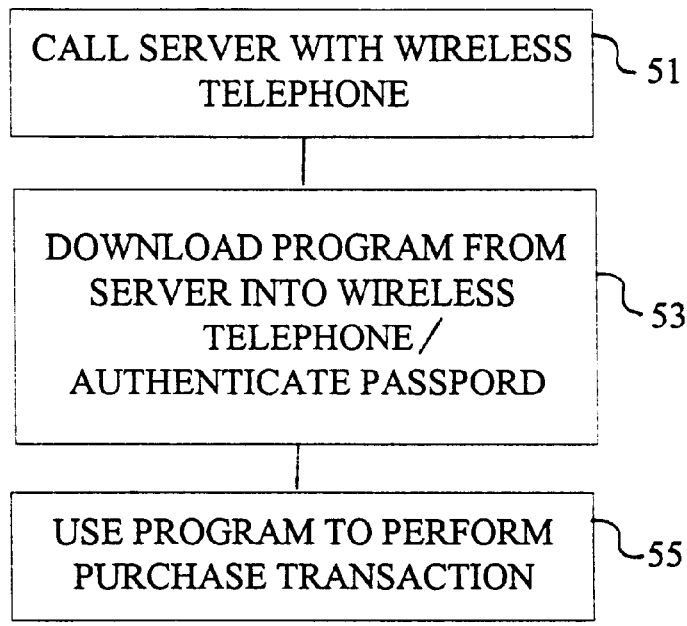
FIG. 5 is a flow chart showing operation of the electronic shopping system of the present invention.

With particular reference to FIG. 5, operation of the electronic shopping system of the present invention generally comprises calling 51 a server 10, 26 with a wireless telephone 18 so as to initiate communication between the wireless telephone 18 and the server 10, 26.

In making such a call, the purchaser merely dials the number of the server 10, 26 for the company from which the purchaser would like to make a purchase. The purchaser is typically unaware whether a store server 10 or a remote server 26 is being called. All operations performed by the purchaser are identical whether a store server 10 or a remote server 26 is called by the purchaser.

Once connection between the wireless telephone and the server is established, then a purchase transaction program is downloaded 53 from the server into the wireless telephone 18. The password is preferably authenticated by the downloaded purchase transaction program. Then, the purchase transaction program is used 55 to perform the desired purchase transactions.

Figure 6:
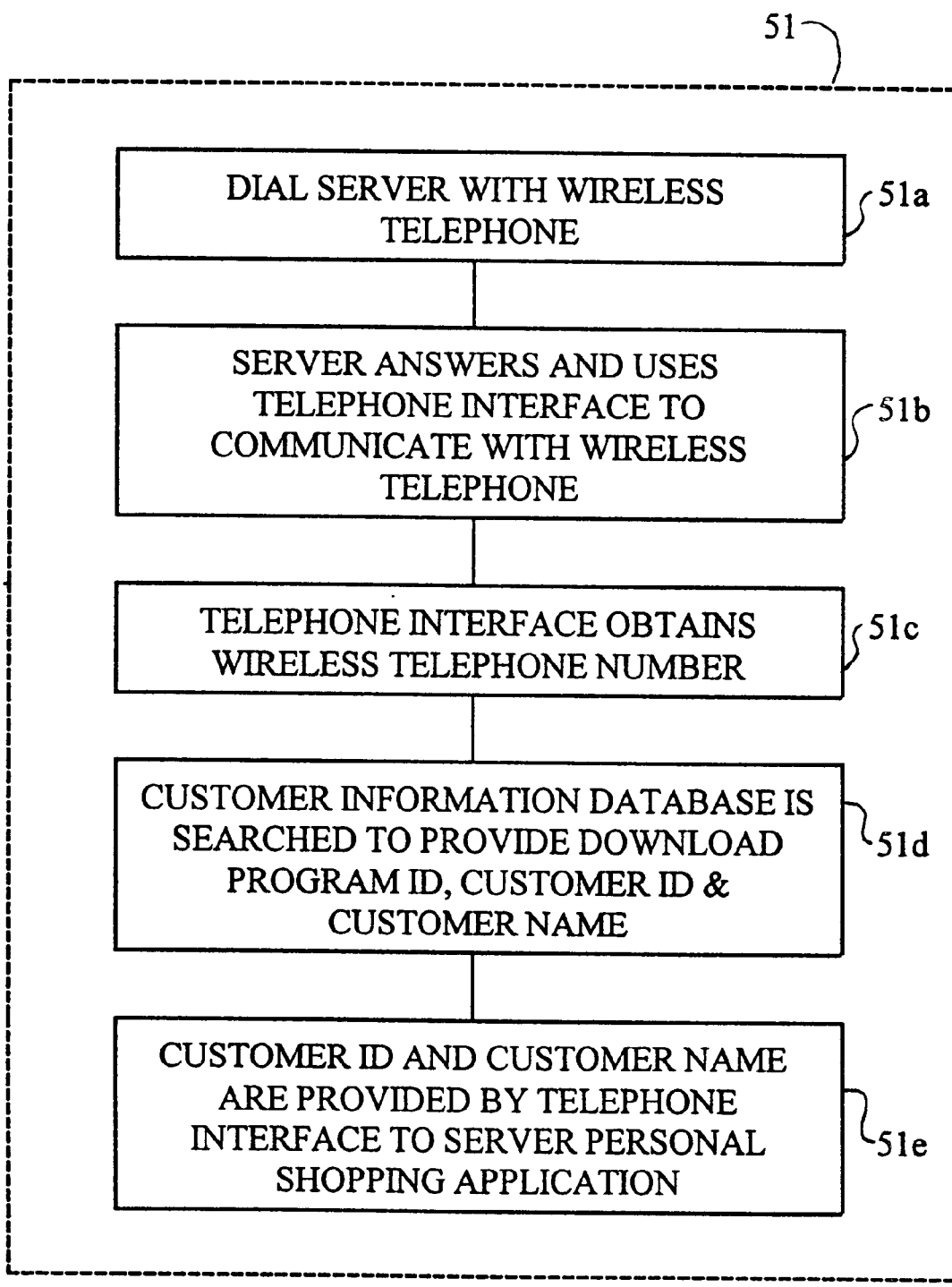
FIG. 6 is a flow chart showing the step of calling the server with the wireless telephone according to FIG. 5, in further detail.

With particular reference to FIG. 6, the step of calling 51 the server 10,26 with the wireless telephone 18 comprises the steps of dialing 51*a* the server 10,26 with the wireless telephone, the server 10,26 answering 51*b* and using the telephone interface to communicate with the wireless telephone, the telephone interface obtaining 51*c* the wireless telephone's number, and the customer information database being searched 51*d* to provide the customer's telephone type, customer ID, and customer name. The customer ID and customer name are provided 51*e* by the telephone interface to the server 10,26 personal shopping application.

Guidance may be provided to the user for manually entering an authorization number, password or the like via the keypad 44 using the display 42 of the telephone or alternatively, via voice instruction. This guidance is preferably provided by the loaded purchase transaction program 106. Alternatively, such guidance may be provided by the server 10, 26 or by store personnel who respond to either voice queries or keyboard entries. The password may be of any desired length.

According to the preferred embodiment of the present invention, two different checks are performed by the server 10, 26 to verify that the customer is an authorized customer. First, the telephone number of the wireless telephone 18 is checked to verify that the wireless telephone 18 is in the customer database and that the owner of the wireless telephone 18 is authorized to make purchase transactions. The customer's telephone number is preferably preregistered, and thus is present in the customer database, if the customer is a valid customer. Verification of the customer telephone number inhibits the making of unauthorized purchase transactions by people other than the authorized customer, e.g., by someone who is using a different wireless telephone.

After downloading of the purchase transaction program to the wireless telephone 18, then the customer may additionally be required to enter the authorization number or the password as discussed above. Both the telephone number and the password entered by the customer must be valid before purchase transactions are permitted. By requiring such an authorization number or password, the making of unauthorized purchase transactions by unauthorized persons using a stolen telephone is very effectively inhibited.

According to the preferred embodiment of the present invention, password authentication is performed by the downloaded purchase transaction program. Alternatively, password authentication is performed by the IC card or by the server 10, 26. Using the downloaded purchase transaction program to perform such password authentication provides desired flexibility and efficiency as compared with password authentication which is performed solely by the server 10, 26 or the wireless telephone 18, without use of the downloaded purchase transaction program. For example, the downloaded purchase transaction program may be configured so as to provide desired assistance in the entering of the password, such as providing instructions for doing so.

The call is made by dialing 51*a* the server's telephone number in a conventional manner. However the wireless telephone 18 may be placed in a program download mode prior to dialing the server's telephone number by either depressing a dedicated button upon the wireless telephone 18 or by entering a preselected code via the keypad 44 thereof. Alternatively, the wireless telephone 18 automatically begins downloading the purchase transaction program from the server 10, 26 upon connection. Such automatic downloading may be facilitated via a control signal, a code and/or header provided by the server 10, 26 which is recognized by channel decoder 144 and microprocessor 38 of the wireless telephone 18, so as to cause the wireless telephone 18 to receive and store the downloaded purchase transaction program according to instructions stored in the firmware memory of the program loader 32.

When a program load is initiated, the newly received purchase transaction program overwrites any previously received purchase transaction program stored in the program memory 34.

When the program load is completed, the program loader 32 transfers control to the loaded purchase transaction program (106 of FIG. 3). When the loaded purchase transaction 106 program initiates execution, the purchase transaction program assumes control over input/output ports 36, keyboard 44, microphone 100 and/or attached devices, e.g., a bar code scanner 20 and/or an IC card reader/writer 27. The purchase transaction program 106 also assumes control over all transmit/receive functions of the wireless telephone. According to the preferred embodiment of the present invention, program data and voice data are combined so as to facilitate the ability to make voice inquiries while the purchase transaction program is being executed.

Figure 7:
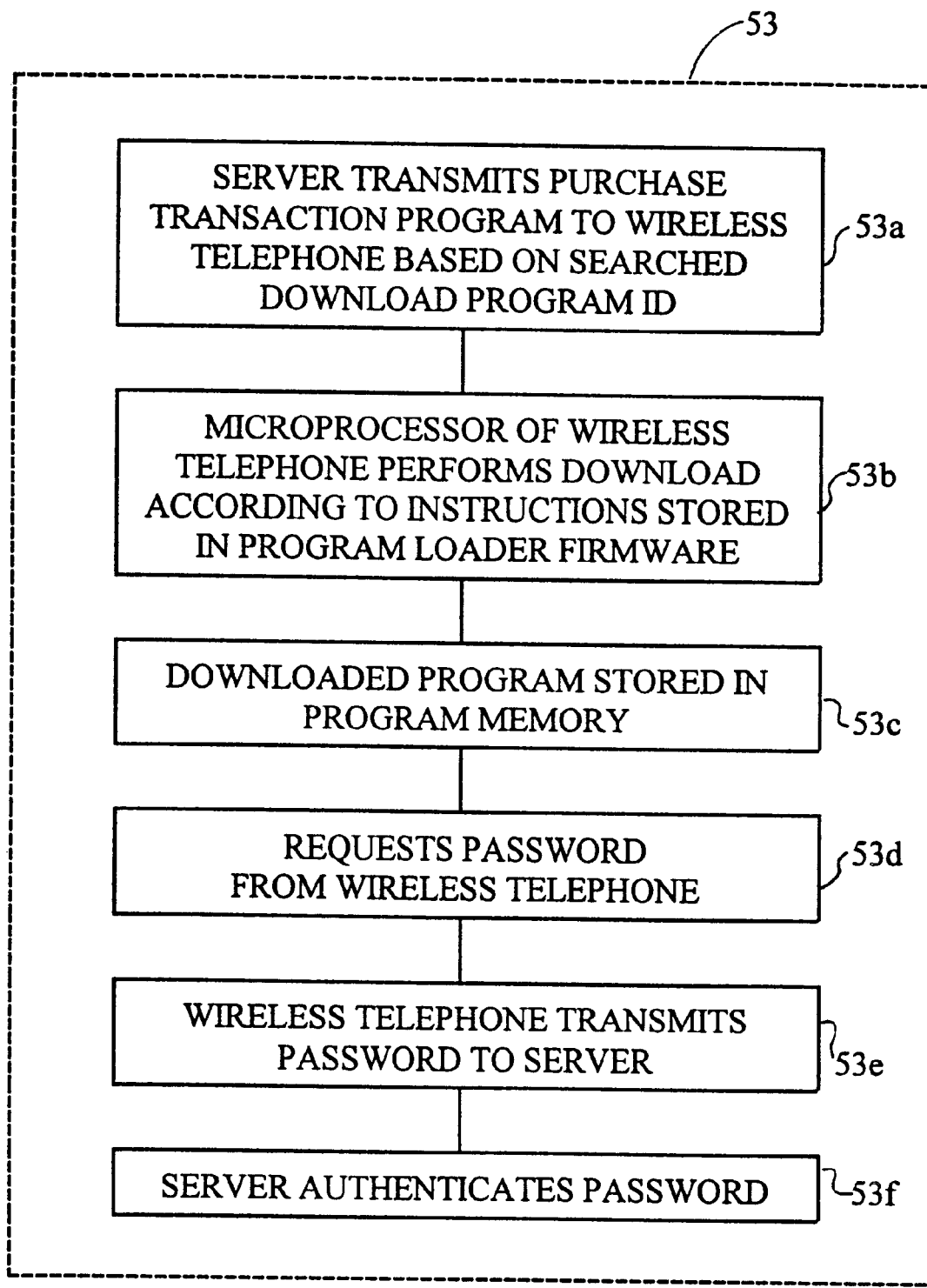
FIG. 7 is a flow chart showing the step of downloading the program from the server into the wireless telephone according to FIG. 5, in further detail.

With particular reference to FIG. 7, the process of downloading 53 a program from the server 10,26 into the wireless telephone comprises the steps of the server 10,26 transmitting 53*a* the desired purchase transaction program (which was selected based upon the user's telephone number) to the wireless telephone 18. The microprocessor of the wireless telephone 18 performs the download 53*b* of the purchase transaction program according to instructions stored in the program loader firmware. The downloaded purchase transaction program is stored 53*c* in the program memory. Then the downloaded purchasing transaction program requests 53*d* a password from the wireless telephone 18. The downloaded purchase transaction program preferably provides guidance for password entry and also provides authentication. Alternatively, the wireless telephone 18 transmits 53*e* the password to the server 10,26, and the server 10,26 authenticates 53*f* the password.

Figure 8:
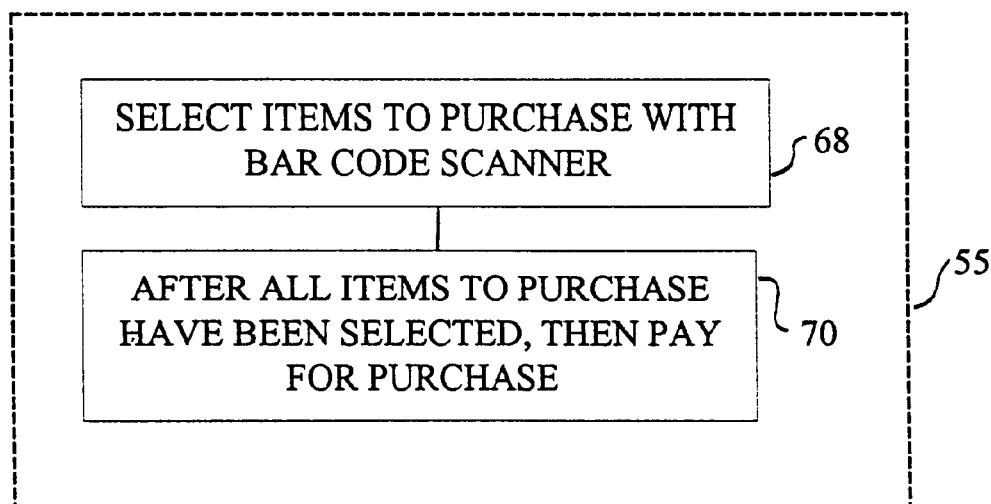
FIG. 8 is a flow chart showing the step of using the program to perform a purchase transaction according to FIG. 5, in further detail.

With particular reference to FIG. 8, once the purchase transaction program has been downloaded and stored in the program memory 34 of the wireless telephone 18, then a purchaser may select 68 items to be purchased. According to the preferred embodiment of the present invention, such selection 68 is effected by scanning UPC bar codes or the like with a bar code scanner 20. Those skilled in the art will appreciate various other codes, indicia, text, etc., may be scanned with various different scanning devices so as to facilitate the selection of items to be purchased. Further, those skilled in the art will appreciate that various other scanning technologies (different from UPC bar code scanning), such as electronic, magnetic, and optical technologies may be utilized to facilitate a product selection. For example, a magnetic tag or an electronic transponder may be placed upon the product, shelf, or within a catalog and may similarly be scanned to effect product selection.

Alternatively, product selections may be made by manually entering a UPC code, stock code or the like into the wireless telephone 18 via the keypad 44 thereof.

According to the preferred embodiment of the present invention, after each product is selected, a description of the product and the price thereof is shown in the display 42 of the wireless telephone 18. This information may comprise part of the purchase transaction program, or alternatively may be communicated from the server 10, 26.

According to the preferred embodiment of the present invention, the purchaser is given an opportunity to either confirm a purchase or to delete the item from the purchase list after each selection is made. The purchaser is preferably also given a choice to confirm or delete each purchase selection once all purchase selections have been made, prior to paying for the purchases.

According to the preferred embodiment of the present invention, the purchaser indicates that all desired purchases have been made by pressing a predetermined key of the keypad 44. The wireless telephone 18 then responds by displaying the total price of all purchases and also preferably provides an opportunity to delete purchases from the list as discussed above.

After all the items to be purchased have been selected 68, then the purchaser preferably pays 70 for the purchases with an IC card, credit card, check card, or the like. Alternatively, the purchaser may manually enter a credit card account number and expiration date or the like into the wireless telephone 18 via keypad 44.

Optionally, a customer may pre-register a credit card with the seller, such that purchases are automatically applied to the credit card account, thereby eliminating the need to enter credit card information or use an IC card or the like to effect payment for the purchased products.

When shopping is completed within a store, then payment may either be effected via the wireless telephone 18, as described above, or alternatively may be performed at the check out counter of the store. When payment is performed at the check out counter of the store, the information stored in the wireless telephone and/or the server 10,26 regarding purchases which have been made may be utilized to conveniently facilitate such payment by eliminating the need for a check out clerk to individually enter purchases.

Alternatively, when used in a store, the purchaser may check out by simply scanning a bar code at the check out counter. The scanned bar code indicates to the server 10, 26 the particular check out counter where the purchaser is located. A list of the purchased items and their prices is then transmitted from the server to the check out counter where the purchaser is located and the purchaser pays a check out clerk for the purchased items in the desired manner, e.g., cash, check, credit card, IC card, etc.

When shopping in a store which utilizes a remote server 26, a purchaser may scan a bar code which indicates to the remote server 26 the store where the purchaser is shopping. This bar code may be displayed, for example, upon a shopping cart. The store location information is then used for inventory management of the purchased items at the store where the items are purchased.

When an IC card reader/writer 27 is utilized, then an electronic receipt for the products purchased may be stored in the IC card, if desired. The stored electronic receipts within the IC card may later be used to communicate personal financial information to a purchaser's home computer, so as to facilitate desired record keeping. If desired, a shopping history for the purchaser may be maintained within the IC card. As those skilled in the art will appreciate, the use of such an IC card further facilitates dual direction authentication, wherein authentication is provided both for customer validation and for server validation.

Optionally, an IC card may additionally be utilized to maintain customer profile data, which may be accessed by the server 10, 26, if desired.

The electronic shopping system of the present invention can be used to sell a variety of products and services It may be implemented to facilitate transactions at either a wholesale or retail level. Indeed, the present invention may be utilized to perform a variety of different types of transactions, other than purchase transactions.

Referring now to FIG. 9, a customer information table is shown. The customer information table is stored as a database by the server and is accessed by the telephone interface 48 and the server personal shopping application 54. According to the preferred embodiment of the present invention, the customer information table stores phone numbers, telephone types, download program identification numbers, passwords, customer identification numbers, customer names, and any other desired customer profile information.

It is understood that the exemplary electronic shopping system described herein shown in the drawings represents only a presently preferred embodiment of the invention. Indeed, various modifications and additions may be made to such embodiment without departing from the spirit and scope of the invention. For example, those skilled in the art will appreciate that various types of wireless telephones, other than conventional cellular telephones, are suitable for the practice of the present invention. Also, various means of wireless communication (other than via a cellular telephone system) between the wireless telephone and the server are contemplated.

Moreover, the download program is not necessarily limited to purchase transaction applications. Any desired application program may similarly be downloaded to a wireless telephone by a program loader. Therefore any application program may be used by the wireless telephone. For example, the wireless telephone of the present invention may similarly be utilized for ticket reservation, seat reservation, food ordering, text/voice guidance, information inquiry, etc.

Thus, these and other modifications and additions may be obvious to those skilled in the art and may be implemented to adapt the present invention for use in a variety of different applications.

What is claimed is:

1. A program downloadable wireless telephone comprising:
   a program memory for storing a downloaded transaction program;
   a program loader comprising a firmware memory, the firmware memory containing instructions for downloading the transaction program from a server into the program memory;
   a microprocessor for executing the instructions contained in the firmware memory of the program loader and for executing the downloaded transaction program stored in the program memory; and
   a scanner in communication with the microprocessor for scanning product indicia of a product to be purchased.

2. An electronic transaction system comprising:
   a server for storing a transaction program and for facilitating electronic transactions;
   at least one wireless telephone for communicating with the server, the wireless telephone(s) comprising:
      a program memory for storing a downloaded transaction program;
      a program loader comprising a firmware memory, the firmware memory containing instructions for downloading the transaction program from a server into the program memory; and
      a microprocessor for executing the instructions contained in the firmware memory of the program loader and for executing the downloaded transaction program stored in the program memory; and
   a scanner coupled to the wireless telephone for scanning product indicia of a product to be purchased.

3. A program downloadable wireless telephone for facilitating performance of purchase transactions, the program downloadable wireless telephone comprising:
   a program memory for storing a downloaded purchase transaction program;
   a program loader comprising a firmware memory, the firmware memory containing instructions for downloading the purchase transaction program from a server into the program memory;
   a microprocessor for executing the instructions contained in the firmware memory of the program loader and for executing the downloaded purchase transaction program stored in the program memory;
   a bar code scanner in communication with the microprocessor for scanning bar codes which indicate products to be purchased; and
   an IC card reader/writer in communication with the microprocessor for facilitating payment for products purchased.

4. An electronic shopping system for facilitating purchase transactions via a wireless telephone, the electronic shopping system comprising:
   a server for storing a purchase transaction program and for facilitating electronic purchase transactions;
   at least one wireless telephone for communicating with the server, the wireless telephone(s) comprising:
      an antenna for receiving a radio frequency signal, the radio frequency signal comprising a purchase transaction program;
      a receiver comprising:
         a radio frequency receiver and/or amplifier coupled to receive the radio frequency signal from the antenna for amplifying the radio frequency signal;

a demodulator coupled to receive the amplified radio frequency signal from the radio frequency receiver and/or amplifier for demodulating the amplified radio frequency signal;

a channel decoder coupled to receive a demodulated signal from the demodulator for separating non-speech digital data from the demodulated signal, the non-speech digital data comprising the purchase transaction program;

a program memory coupled to receive the purchase transaction program from the channel decoder for storing the purchase transaction program; and a program loader for downloading a purchase transaction program from the server into the program memory; and a scanner coupled to the wireless telephone for scanning product indicia of a product to be purchased.

5. The electronic shopping system according to claim 4, wherein the server is disposed proximate a store with which purchase transactions are performed.

6. The electronic shopping system according to claim 4, wherein the server is disposed at a location which is remote from the store with which purchase transactions are performed.

7. The electronic shopping system according to claim 4, further comprising an extension PBX in communication with the server for facilitating wireless communication between the server and the wireless telephones(s).

8. The electronic shopping system according to claim 4, wherein the program loader comprises a firmware memory.

9. The electronic shopping system according to claim 4, wherein the program loader comprises a firmware memory, the firmware memory containing instructions which are executed to effect storage in the program memory of the purchase transaction program received by the wireless telephone.

10. The electronic shopping system according to claim 9, wherein the wireless telephone further comprises a microprocessor in communication with the program loader and the program memory for executing the instructions stored within the firmware memory of the program loader and for executing the purchase transaction program stored within the program memory.

11. The electronic shopping system according to claim 10, wherein at least one of the wireless telephones further comprises an input and/or output port in communication with the microprocessor, to which the scanner is attachable.

12. The electronic shopping system according to claim 11, further comprising a catalog containing bar codes representative of items to be purchased, the bar codes being scanable by the scanner.

13. The electronic shopping system according to claim 10, wherein at least one of the wireless telephones further comprises an IC card reader/writer in communication with the microprocessor.

14. The electronic shopping system according to claim 4, further comprising:
a housing within which the program memory and the program loader are disposed, wherein the scanner is disposed substantially within the housing.

15. The electronic shopping system according to claim 4, further comprising:
a housing within which the program memory and the program loader are disposed; and
an IC card reader/writer disposed substantially within the housing.

16. A program downloadable wireless telephone comprising:

an antenna for receiving a radio frequency signal, the radio frequency signal comprising a purchase transaction program;

a receiver comprising:
a radio frequency receiver/amplifier coupled to receive the radio frequency signal from the antenna for amplifying the radio frequency signal;
a demodulator coupled to receive the amplified radio frequency signal from the radio frequency receiver/amplifier for demodulating the amplified radio frequency signal;
a channel decoder coupled to receive a demodulated signal from the demodulator for separating non-speech digital data from the demodulated signal, the non-speech digital data comprising the purchase transaction program;
a program memory coupled to receive the purchase transaction program from the channel decoder for storing the purchase transaction program; and
a program loader for downloading the purchase transaction program from a server into the program memory; and a scanner coupled to the receiver for scanning product indicia of a product to be purchased.

17. The program downloadable wireless telephone according to claim 16, wherein the program loader comprises a firmware memory.

18. The program downloadable wireless telephone according to claim 16, wherein the program loader comprises a firmware memory, the firmware memory containing instructions which are executed to effect storage of the purchase transaction program within the program memory.

19. The program downloadable wireless telephone according to claim 18, further comprising a microprocessor in communication with the program loader and the program memory for executing the instructions stored within the firmware memory of the program loader and for executing the purchase transaction program stored within the program memory.

20. The program downloadable wireless telephone according to claim 19, further comprising an input and/or output port in communication with the microprocessor, to which the scanner is attachable.

21. The program downloadable wireless telephone according to claim 19, further comprising an IC card reader/writer in communication with the microprocessor.

22. The program downloadable wireless telephone according to claim 16, further comprising:
a housing within which the program memory and the program loader are disposed, wherein the scanner is disposed substantially within the housing.

23. The program downloadable wireless telephone according to claim 16, further comprising:
a housing within which the program memory and the program loader are disposed; and
an IC card reader/writer disposed substantially within the housing.

24. A method for performing purchase transactions via a wireless telephone, the method comprising the steps of:
calling a server with the wireless telephone;
transmitting a radio frequency signal comprising a purchase transaction program to the wireless telephone, the radio frequency signal being received by an antenna of the wireless telephone;
amplifying the radio frequency signal received by the antenna to provide an amplified radio frequency signal;

demodulating the amplified radio frequency signal to provide a demodulated signal;

separating the purchase transaction program from the demodulated signal; and using a scanner in communication with the wireless telephone for scanning product indicia of a product to be purchased; and transmitting the scanned product indicia to the purchase transaction program to perform a purchase transaction.

25. The method according to claim 24, wherein the step of storing the purchase transaction program comprises using a program loader to store the purchase transaction program.

26. The method according to claim 24, wherein the step of calling a server comprises calling a server disposed proximate a store where items are to be purchased.

27. The method according to claim 24, wherein the step of calling a server comprises calling a server disposed at a location remote from the store where items are to be purchased.

28. The method according to claim 24, wherein the step of calling a server comprises calling a server via an extension PBX.

29. The method according to claim 24 further comprising using an IC card reader/writer in communication with the wireless telephone to effect payment for a purchased item.

30. The method as recited in claim 24, further comprising the step of communicating by voice via the wireless telephone to make an inquiry about a product while the purchase transaction program is being executed.

31. The method as recited in claim 24, further comprising the step of transmitting a voice communication from the server to the wireless telephone while the purchase transaction program is being executed.

32. The method as recited in claim 24, wherein the step of transmitting a radio frequency signal comprises transmitting a purchase transaction program which is compatible with a plurality of different wireless telephone types.

33. The method as recited in claim 24, further comprising the step of:

determining a purchaser's telephone type by interrogating a database based on a caller's telephone number; and wherein the step of transmitting a radio frequency signal comprises transmitting a purchase transaction program which is tailored to the purchaser's telephone type.

34. The method as recited in claim 24, further comprising the step of:

determining a download purchase transaction program by interrogating a database based on caller's telephone number; and wherein the step of transmitting a radio frequency signal comprises transmitting a purchase transaction program which is tailored to the purchaser's profile and/or preference, such as languages and interest.

35. The method as recited in claim 24, further comprising the step of having a server determine if a customer is a valid customer by verifying that a telephone number of the wireless telephone is an authorized pre-registered telephone number and subsequently allowing purchase transactions only if the telephone number is an authorized pre-registered telephone number.

36. The method as recited in claim 35, further comprising the step of having a server determine if a password entered by the customer into the wireless telephone is a valid password, the password being entered under control of the purchase transaction program, and allowing purchase transactions only if the password number is a valid password for the customer.

* * * * *